(12) United States Patent
Mirzoev (10) Patent No.: US 9,364,123 B1
(45) Date of Patent: Jun. 14, 2016

(54) DISPOSABLE SINGLE USE PORTABLE TOILET

(71) Applicant: Levan Mirzoev, Staten Island, NY (US)

(72) Inventor: Levan Mirzoev, Staten Island, NY (US)

( * ) Notice: Subject to any disclaimer, the term of this patent is extended or adjusted under 35 U.S.C. 154(b) by 220 days.

(21) Appl. No.: 14/279,849

(22) Filed: May 16, 2014

(51) Int. Cl.
  A47K 3/00 (2006.01)
  A47K 11/02 (2006.01)
  A47K 13/30 (2006.01)
  A47K 13/24 (2006.01)

(52) U.S. Cl.
  CPC .............. *A47K 11/02* (2013.01); *A47K 13/242* (2013.01); *A47K 13/302* (2013.01)

(58) Field of Classification Search
  CPC ..... A47K 11/02; A47K 11/06; A47K 13/242; A47K 13/302; A47K 13/12; A61G 9/00; A61G 9/003
  USPC ............. 4/449, 450–453, 458, 485, 222, 233, 4/245.1, 245.4, 245.5, 245.7, 242.1, 234
  See application file for complete search history.

(56) References Cited

U.S. PATENT DOCUMENTS

| 702,603 | A | * | 6/1902 | Stockdale | A61G 9/003 4/450 |
| 2,169,834 | A | * | 8/1939 | Englert | A61G 9/003 4/245.4 |
| 2,849,726 | A | | 9/1958 | Vay | |
| 2,912,702 | A | | 11/1959 | Mackenzie | |
| 3,005,994 | A | | 10/1961 | Heil | |
| 3,159,848 | A | | 12/1964 | Arndt, Jr. | |
| 3,452,368 | A | | 7/1969 | Couper | |
| 3,484,875 | A | * | 12/1969 | Eisenberg | A47C 4/52 108/115 |
| 3,859,125 | A | * | 1/1975 | Miller | B65D 65/42 229/164.2 |
| 4,136,798 | A | * | 1/1979 | Oberstein | A61G 9/003 206/525 |
| 4,343,053 | A | * | 8/1982 | O'Connor | A61G 9/003 383/120 |
| 4,899,399 | A | * | 2/1990 | Young | A61G 9/003 4/450 |
| 5,040,249 | A | | 8/1991 | Diaz | |
| 5,048,130 | A | | 9/1991 | Brotman et al. | |
| 5,524,301 | A | | 6/1996 | McGuire | |
| 2006/0097189 | A1 | * | 5/2006 | Lim | A47K 13/302 250/492.1 |
| 2007/0083179 | A1 | * | 4/2007 | Fuentes | A61F 15/003 604/385.02 |
| 2009/0165199 | A1 | * | 7/2009 | Heumann | A47K 11/02 4/483 |
| 2009/0172872 | A1 | * | 7/2009 | Macey | A47K 11/06 4/451 |
| 2009/0255046 | A1 | | 10/2009 | Carter et al. | |
| 2010/0275362 | A1 | * | 11/2010 | Biesinger | A47K 11/02 4/483 |
| 2010/0306913 | A1 | * | 12/2010 | Zazzara | A61G 9/003 4/451 |
| 2012/0084908 | A1 | * | 4/2012 | Dunn | E03D 9/007 4/483 |
| 2012/0192343 | A1 | * | 8/2012 | Richardson | A47K 11/02 4/449 |

FOREIGN PATENT DOCUMENTS

| GB | 686682 | 1/1953 |
| GB | 2246705 | 12/1992 |

* cited by examiner

Primary Examiner — J. Casimer Jacyna
Assistant Examiner — Benjamin R Shaw
(74) Attorney, Agent, or Firm — Michael I. Kroll (57) ABSTRACT

A disposable portable toilet comprised of a toilet packaged within a resealable container having a zip lock so that the toilet can be placed back into container after use for disposal. The disposable portable toilet has a lightweight rigid housing with a zippered cover with a plurality of toilet accessories attached to the underside of the seat and containing antibacterial agent used to neutralize any pathogen contamination leaking from said disposable portable toilet after use.

17 Claims, 9 Drawing Sheets

DISPOSABLE SINGLE USE PORTABLE TOILET

BACKGROUND OF THE INVENTION

1. Field of the Invention

The present invention relates generally to toilets and, more specifically, to a disposable single use portable toilet that can be stored in a motor vehicle for emergency use.

The disposable portable toilet is comprised of a toilet packaged within a resealable container having a zip lock so that the toilet can be placed back into container after use for disposal.

The disposable portable toilet comprises rigid housing having a zippered cover with a plurality of toilet accessories attached to the underside of the seat and anti-bacterial agent used to neutralize any pathogen contamination leaking from said disposable portable toilet after use.

2. Description of the Prior Art

There are other toilet devices designed for travel. Typical of these is U.S. Pat. No. 2,849,726 issued to Vay on Sep. 2, 1958.

Another patent was issued to Mackenzie on Nov. 17, 1959 as U.S. Pat. No. 2,912,702. Yet another U.S. Pat. No. 3,005,994 was issued to Heil on Oct. 31, 1961 and still yet another was issued on Dec. 8, 1964 to Arndt, Jr. as U.S. Pat. No. 3,159,848.

Another patent was issued to Couper on Jul. 1, 1969 as U.S. Pat. No. 3,452,368. Yet another U.S. Pat. No. 3,484,875 was issued to Eisenberg on Dec. 23, 1969. Another was issued to Diaz on Aug. 20, 1991 as U.S. Pat. No. 5,040,249 and still yet another was issued on Sep. 17, 1991 to Brotman, et al. as U.S. Pat. No. 5,048,130.

Another patent was issued to McGuire on Jun. 11, 1996 as U.S. Pat. No. 5,524,301. Yet another U.S. Patent Application Publication No. 2009/0165199 was issued to Heumann on Jul. 2, 2009. Another patent was issued to Carter et al. on Oct. 15, 2009 as U.S. Patent Application Publication No. 2009/0255046. Another was published to Craft on Jan. 28, 1953 as U.K. Patent No. GB686,682 and still yet another was published on Dec. 2, 1992 to Al-Asir as U.K. Patent No. GB2246705.

U.S. Pat. No. 2,849,726

Inventor: Spencer B. Vay

Issued: Sep. 2, 1958

A portable commode made of foldable sheet material, comprising: first, second and third column-forming panels foldably hingedly joined together at their adjacent side edges; said column-forming panels positionable relative to one another to form a hollow vertical open-ended column generally triangular plan; first, second and third top-forming flaps each hingedly foldably joined along one of its major sides to the top edges of said first, second and third column-forming panels, respectively; each said top flap patterned generally similar in shape and proportions to the triangular configuration defined by said column, all of said flaps foldable across the top open end of said column in vertically superposed relationship.

U.S. Pat. No. 2,912,702

Inventor: Ernest W. Mackenzie

Issued: Nov. 17, 1959

In a portable commode, a foldable tubular base unit of uniform polygonal outline in plan having upright rectangular side panels extending to a common top plane, a foldable seat unit having a continuous peripherally sectioned rim complementarily receiving said base unit and providing an interiorly apertured seat board of laminated structure having the laminations thereof comprising hingedly attached extensions of the rim sections and disposed in mutually parallel opposed relation to provide the seat board, an excreta-receiving bag depending through the seat board aperture and having the portion thereof about the aperture folded outwardly about the seat unit in closely fitting relation thereto for securing the upper bag portion to the seat unit.

U.S. Pat. No. 3,005,994

Inventor: Theodore Heil

Issued: Oct. 31, 1961

A portable toilet device to support a disposable and flexible bag comprising an upstanding tubular body of bendable but relatively stiff material, said body having a pair of opposed vertical score lines thereon and being initially collapsed by bending on said lines to a substantially flat condition and adapted to be expanded to a substantially circular form to then receive the bag, means to expand the body comprising an initially slack non-elastic tension cord connected at one end to the body adjacent one score line and extending in said body to adjacent the other score line, the body having an opening adjacent said other score line and through which the cord freely passes for finger grasping.

U.S. Pat. No. 3,159,848

Inventor: Joseph M. Arndt, Jr.

Issued: Dec. 8, 1964

A three-piece portable commode comprising an outer closed wall structure formed by a plurality of connected side wall panels, an inner closed wall structure formed by a like number of connected side wall panels, said inner wall structure being positioned inside the outer wall structure with each side wall panel of the inner wall structure being adjacent to but spaced from a corresponding side wall panel of the outer structure, said panels being of substantially equal height and a seat member including a top closure wall with a toilet opening therethrough.

U.S. Pat. No. 3,452,368

Inventor: John R. Couper

Issued: Jul. 1, 1969

A portable Waste dispenser comprising frame means arranged with an upper opening to hold a disposable container in position to receive waste, a receiver for a length of disposable plastic tubing mounted adjacent said opening and arranged to permit a portion of the same to hang downwardly; seal-valve means inclusive of means for forming spaced-apart upper and lower temporary seals laterally across said tubing, said seal-valve means mounted in said frame means below said receiver and arranged to stepwise temporarily seal said tubing at said upper and lower seal means progressively one above the other along said tubing.

U.S. Pat. No. 3,484,875

Inventor: Harvey Eisenberg

Issued: Dec. 23, 1969

A commode comprising, (a) a seat having a groove of polygonal configuration formed in the bottom surface thereof, and (b) a one-piece collapsible tubular base expandable into a corresponding polygonal configuration, one end of said base being insertable into the said groove to form an assemblage and the other end of the base being inwardly-folded upon itself to form an internal end portion.

U.S. Pat. No. 5,040,249

Inventor: Richard Diaz

Issued: Aug. 20, 1991

A portable, collapsible toilet with a central, main section of box-like construction, which is made of corrugated cardboard, which central section is open both on the top and bottom, and accepts therein a disposable, plastic bag which receives the human waste products. The central section is flanked on either side thereof by a small, box-like supportive end-section upon which one directly sits during use of the commode. Each box-like end-section is also made of corrugated cardboard, is open on the top and bottom, and has an intermediate stiffening member to enhance its structural integrity, in order to support greater weight thereon. The central section is provided with a pair of pivotal cover-members formed integrally with the upper edge surfaces of the central section. Each cover-member is a flat sheet of cardboard, and pivotally connected to a respective upper edge surface of the central section, so that during storage of the commode, each cover-member is in its downwardly-pivoted state within the interior of the central section. In the erected state of the commode, each cover-member is pivoted up and out of the central section's interior, and pivoted until it closes off the open top of a respective box-like end-section, whereby the two cover-members thus provide a pair of spaced-apart seat-surfaces upon which one may sit during use.

U.S. Pat. No. 5,048,130

Inventor: Charles J. Brotman et al.

Issued: Sep. 17, 1991

A portable, knockdown toilet includes a top unit and a bottom unit which cooperate with each other to define a carrying case into which a collapsible midunit, a collapsible insert unit, collection bags, and accessories are placed for carrying and storage. A handle is attached to the carrying case. Flexible waste collection bags are included, and a desiccant gel is also included as are bag ties so cleanup is facilitated.

U.S. Pat. No. 5,524,301

Inventor: David McGuire

Issued: Jun. 11, 1996

A lightweight, portable toilet which is disposable after use. The apparatus is comprised of sturdy biodegradable, environmentally safe corrugated paper board which is capable of being incinerated or buried in the earth's surface after use. The disposable toilet is comprised of a seat member which is placed over the top of a substantially rectangular base member. The seat member contains a rounded rectangular opening. The bottom of the base member is open so as to allow human waste excretions to fall into a pre-excavated hole in the earth's surface located directly underneath the toilet. After use, the toilet can be moved to a new location or disposed of and the hole covered with soil.

U.S. Patent Number 2009/0165199

Inventor: Nir Heumann

Published: Jul. 2, 2009

A portable toilet comprising: (a) a base adapted to support a weight of a user; (b) a seat positionable upon the base and adapted to support a weight of the user and including a hole through which waste may be passed by the user and (c) a waste receptacle permanently attached to the seat.

U.S. Patent Number 2009/0255046

Inventor: William Carter et al.

Published: Oct. 15, 2009

A disposable portable toilet that is efficiently fabricated from foldable stock, such as corrugated cardboard, with minimal waste and adapted with a fluid absorbing inner liner is disclosed. Foldable stock material is formed as a blank sheet having a plurality of fold lines defining multiple panels disposed in side-by-side relation, and a joining tab. Each panel includes a fold-in tab that functions to provide a rim. The blank sheet provides a structure that may be configured to form a support structure that is selectively configurable from a collapsed configuration to an expanded configuration. An absorbent liner is insertedly received within the support structure. Padding sections are disposed on the liner in proximity to overlay the top rim of the support structure when the liner is received therein thereby providing the device with a padded upper rim. A drawstring functions as a closure member to close the liner after use. The present invention thus provides a disposable toilet that is particularly suited for emergency use by anyone, and particularly for use by small children while away from home.

U.K. Patent Number GB 686,682

Inventor: Sydney Craft

Published: Jan. 28, 1953

A collapsible lavatory basin or chamber pot has an annular wall comprising a series of superimposed collapsible chambers which inter-communicate for simultaneous inflation and deflation whereby the said basin or pot can be brought to an erect position or to a substantially flat collapsed position, said basin or pot having a liquid-tight cup-like containing space encompassed by said wall. In the form shown, the wall consists of four annular air chambers 10 each formed by two flat rings 11, 12, the meeting edges of the rings of adjacent chambers being bonded at ribs 14. The latter are apertured at 15, and a lining 17 may be secured at 18 to the uppermost ring with its base 19 close to the rigid or flexible base 16 of the basin or pot. An inflation nozzle with a valve or plug is provided, and an inflatable handle, connected to the upper and lower rings, may be fitted. An expandable liner, e.g. of waterproof paper, may be inserted into the basin or pot before use. Air or warm water may be used as the inflating fluid.

U.K. Patent Number GB 2 246 705

Inventor: Rebeea Al-Asir

Published: Feb. 12, 1992

A portable toilet has a set of separately inflatable annular rings 10, 11 arranged one on top of the other. The bottom ring has a flat closed base. The upper ring receives a disposable liner when the inflated toilet is in use. The upper ring is detachable for use with a conventional toilet. The bottom ring is visually distinguished, for example by being triangular in shape, in order to avoid being selected for such use. Releasable fasteners such as press stud or hook-and-pile fabric 17-20 may be employed.

While these commodes may be suitable for the purposes for which they were designed, they would not be as suitable for the purposes of the present invention, as hereinafter described.

SUMMARY OF THE PRESENT INVENTION

A primary object of the present invention is to provide a disposable portable toilet for travel use.

Another object of the present invention is to provide a disposable portable toilet having a rigid housing that will support a user sitting thereon.

Yet another object of the present invention is to provide a disposable portable toilet having a cover that is sealed by a zipper that when opened provides access thereto and seals the disposable portable toilet after use.

Still yet another object of the present invention is to provide a disposable portable toilet wherein said seat cover exterior side has a graphic image and instructions printed thereon.

Another object of the present invention is to provide a disposable portable toilet wherein said seat cover interior side has a plurality of individually sealed toilet article releasably attached thereto.

Yet another object of the present invention is to provide a disposable portable toilet further comprising a package of an amount of antibacterial agent to neutralize any pathogen contamination.

Additional objects of the present invention will appear as the description proceeds.

The present invention overcomes the shortcomings of the prior art by providing a disposable toilet comprising rigid housing having a zippered cover with a plurality of toilet accessories attached to the underside of the seat and a package of an anti-bacterial agent that is added to the bowl prior to use to neutralize any pathogen contamination leaking from said disposable portable toilet after use.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the figures illustrate the Disposable Single Use Portable Toilet of the present invention. With regard to the reference numerals used, the following numbering is used throughout the various drawing figures.

10 Disposable Single Use Portable Toilet of the present invention
12 user
14 Motor Vehicle
16 Resealable Container
18 zip lock
20 indicia
22 toilet housing
24 receptacle
26 lid
28 hinge
30 zipper
32 wall
34 seat
36 base
38 seal
40 antibacterial agent
42 packet
44 tear strip
46 body wipes
48 hand wipes
50 air freshener
52 covering
54 scent
56 trash container
58 toilet body interior
60 upper seat periphery
62 lid interior side

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

Figure 1:
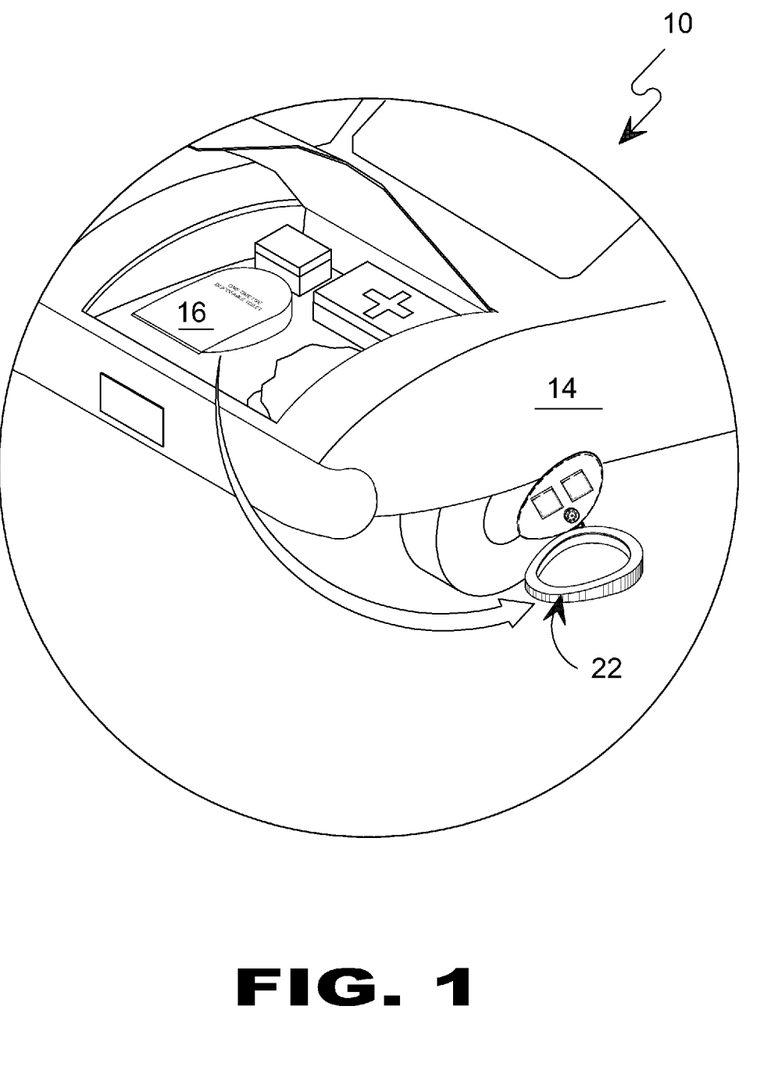
FIG. 1 is an illustrative view of the present invention.

Referring to FIG. 1, shown is an illustrative view of the present invention. The present invention is a disposable single use portable toilet 10 that can be stored in a motor vehicle 14 for emergency use. The disposable toilet 10 comprises a resealable container portion 16 and a toilet portion 22 whereby a user can retrieve the disposable toilet for urination or defecation in an emergency situation when rest room services are unavailable. It is contemplated that the resealable container portion 16 would be made of a flexible material to allow for easier storage in the vehicle. The disposable single use portable toilet 10 can be used in the privacy of the vehicle 14 rather than stepping into wooded areas or looking for secluded locations.

Figure 2:
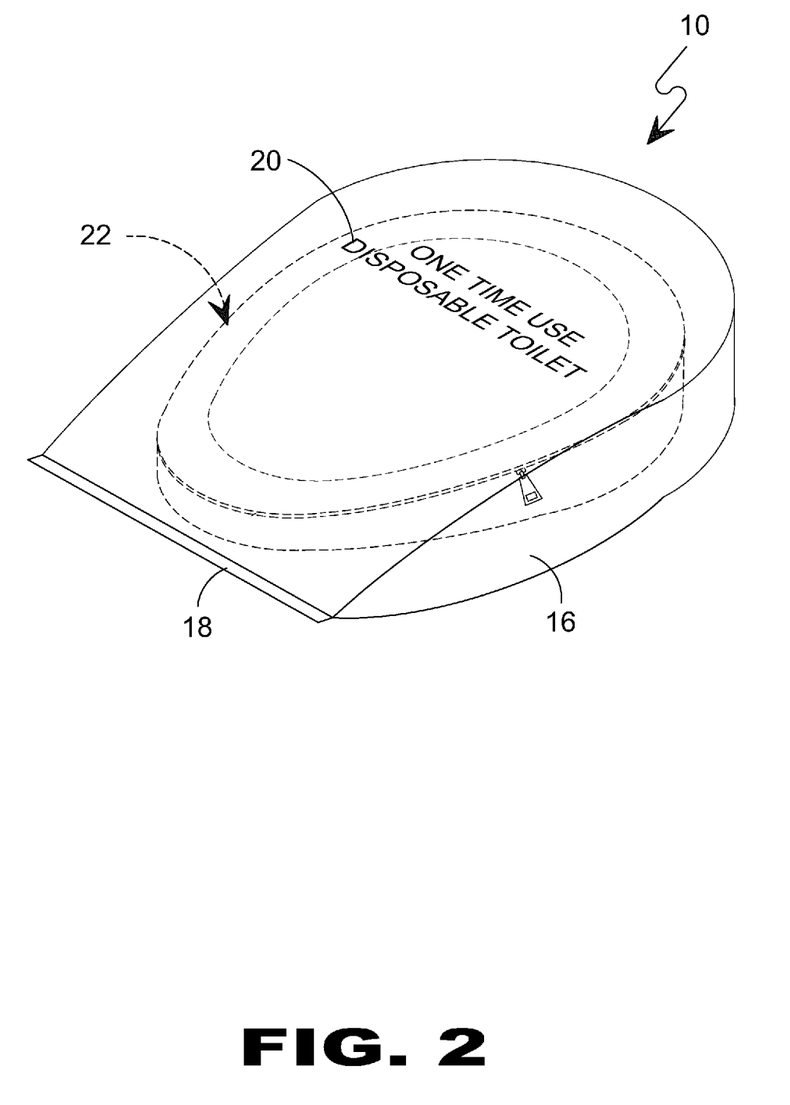
FIG. 2 is an illustrative view of the disposable single use portable toilet.

Referring to FIG. 2, shown is an illustrative view of the disposable single use portable toilet. Shown is the disposable portable toilet 10 comprising a toilet portion 22 packaged within a resealable container 16 having a zip lock 18 so that the toilet portion 22 can be placed back into container 16 after use and disposed of. It should be noted that though the resealing means is shown as a "zip-lock" type of apparatus, many other means such as adhesives or hook and loop type fasteners could be used without departing from the spirit of the invention. The present invention provides that the exterior surface of the resealable container 16 may have graphic design and/or indicia 20 located thereon, which may include instructional use information.

Figure 3:
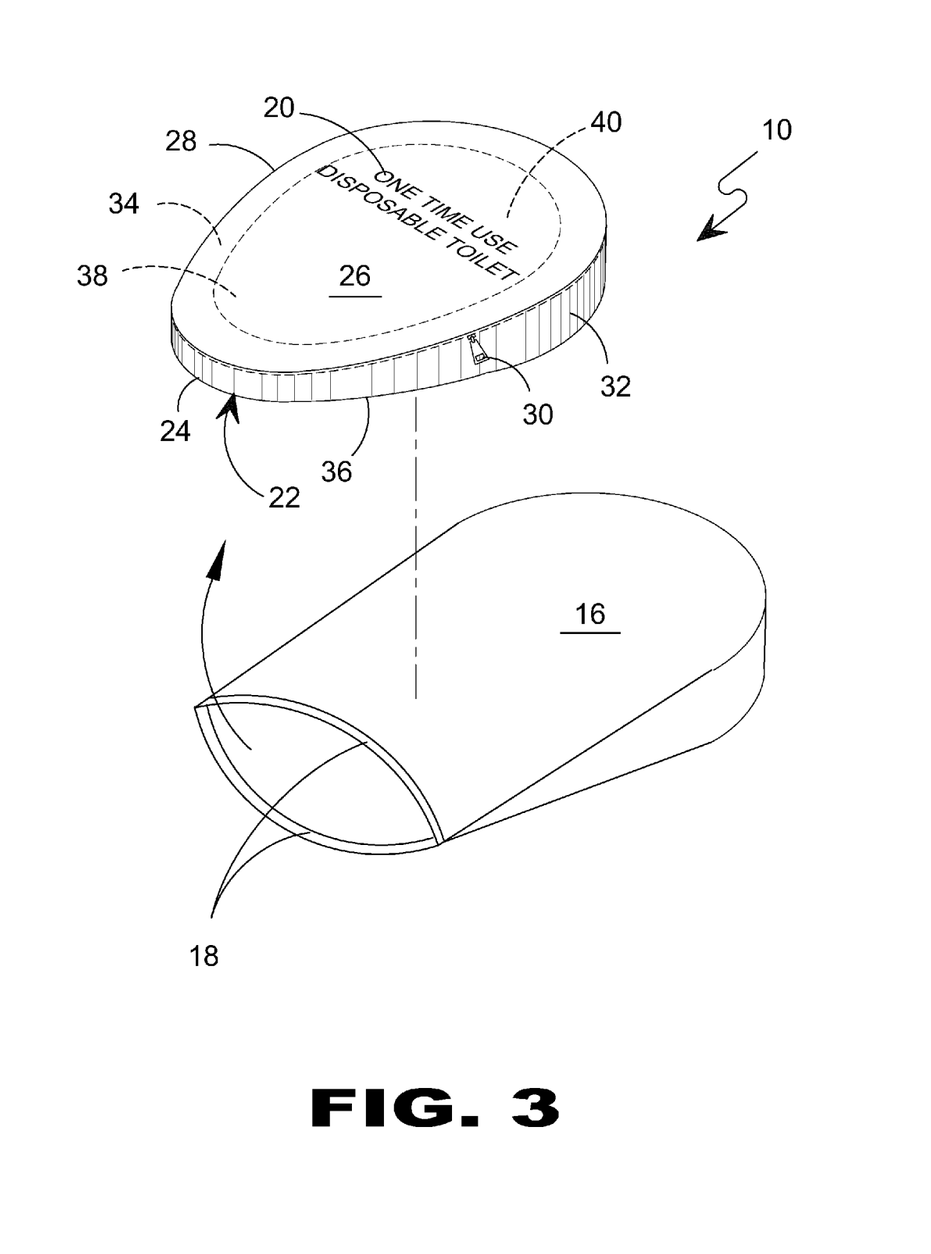
FIG. 3 is an illustrative view of the disposable portable toilet.

Referring to FIG. 3, shown is an illustrative view of the disposable portable toilet. Shown is the disposable single use portable toilet 10 comprising a resealable container 16 having zip lock 18 with the toilet 22 removed therefrom. The toilet 22 is comprised of base 36 with wall 32 extending vertically to seat 34 forming receptacle 24 containing antibacterial agent 40 that is covered by seal 38 with lid 26 having hinge 28 and zipper 30 attached thereto. The present invention provides that the exterior surface of the toilet 22 may have graphic design and/or indicia 20 located thereon, which may include instructional use information. The toilet 22 has a lightweight rigid housing of substantially ovoid shape with the front end thinner than the back end to reduce the amount of material used in manufacture. The materials from which the toilet 22 housing may be made are various. Corrugated cardboard, for example, is one, however various recycled materials such as paper, plastic, fiberglass, or a combination of any of them could be used. Various other plant fibers such as hemp or bamboo could also be used.

Figure 4:
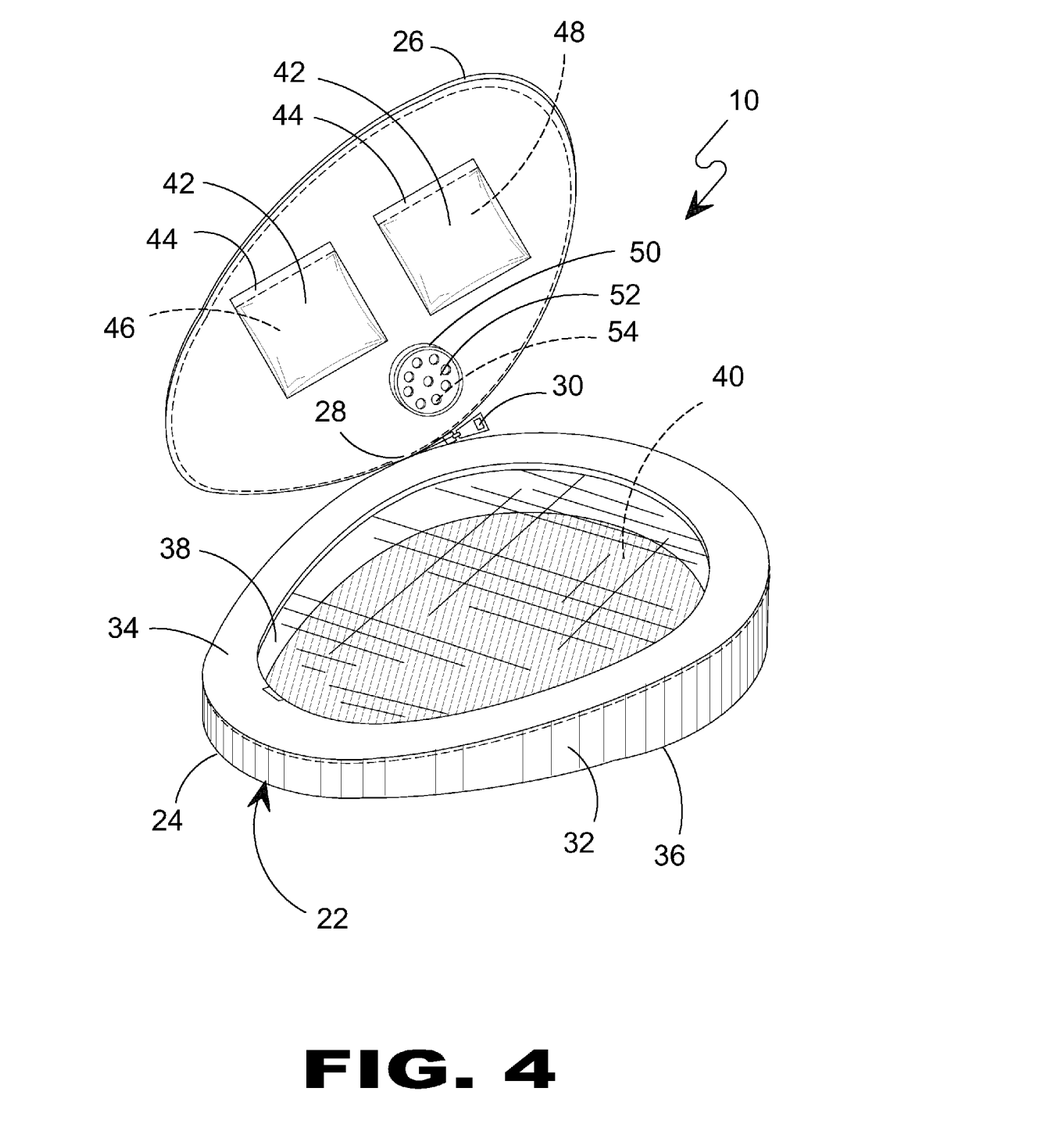
FIG. 4 is an illustrative view of the disposable portable toilet opened.

Referring to FIG. 4, shown is an illustrative view of the disposable portable toilet opened. Shown is the disposable single use portable toilet 22 comprised of rigid housing 24 having base 36, wall 32 and seat 34 covered by a peelably removable seal 38 with antibacterial agent 40 contained therein. Lid 26 is attached to receptacle 24 via hinge 28 and zipper 30. On the interior side of lid 26 a plurality of packets 42 having tear strip 44 are provided for housing toiletries including body wipes 46 and hand wipes 48. Also provided is air freshener 50 having cover 52 that when removed releases scent 54.

Figure 5:
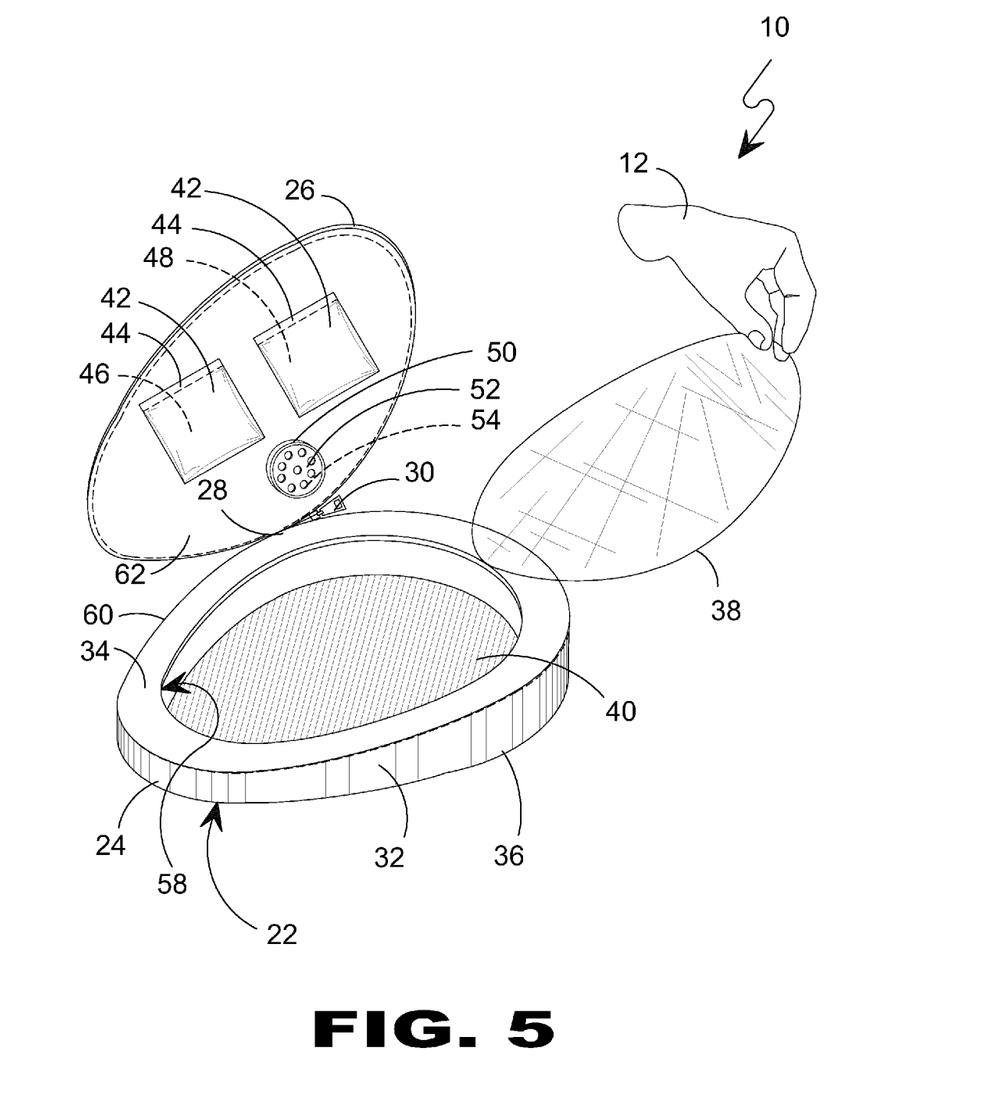
FIG. 5 is an illustrative view of the disposable portable toilet opened and the seal removed.

Referring to FIG. 5, shown is an illustrative view of the disposable portable toilet opened and the seal removed. Depicted is the disposable single use portable toilet 22 with seal 38 being removed by user 12 allowing use of said toilet. The toilet is comprised of rigid housing 24 having base 36, wall 32 and seat 34 covered by a peelably removable seal 38 that, when removed exposes the interior 58 of the toilet portion 22 that includes an antibacterial agent 40 contained therein. Lid 26 is attached to lower toilet body portion or receptacle 24 via hinge 28 and zipper 30. It should be noted that hinge 28 may be located at any convenient location about the upper periphery 60 of the seat portion 34. On the interior side, indicated at 62 of lid 26 a plurality of packets 42 having tear strip 44 are provided for housing toiletries such as body wipes 46 and hand wipes 48. Also provided is air freshener 50 having cover 52 that when removed releases scent 54.

Figure 6:
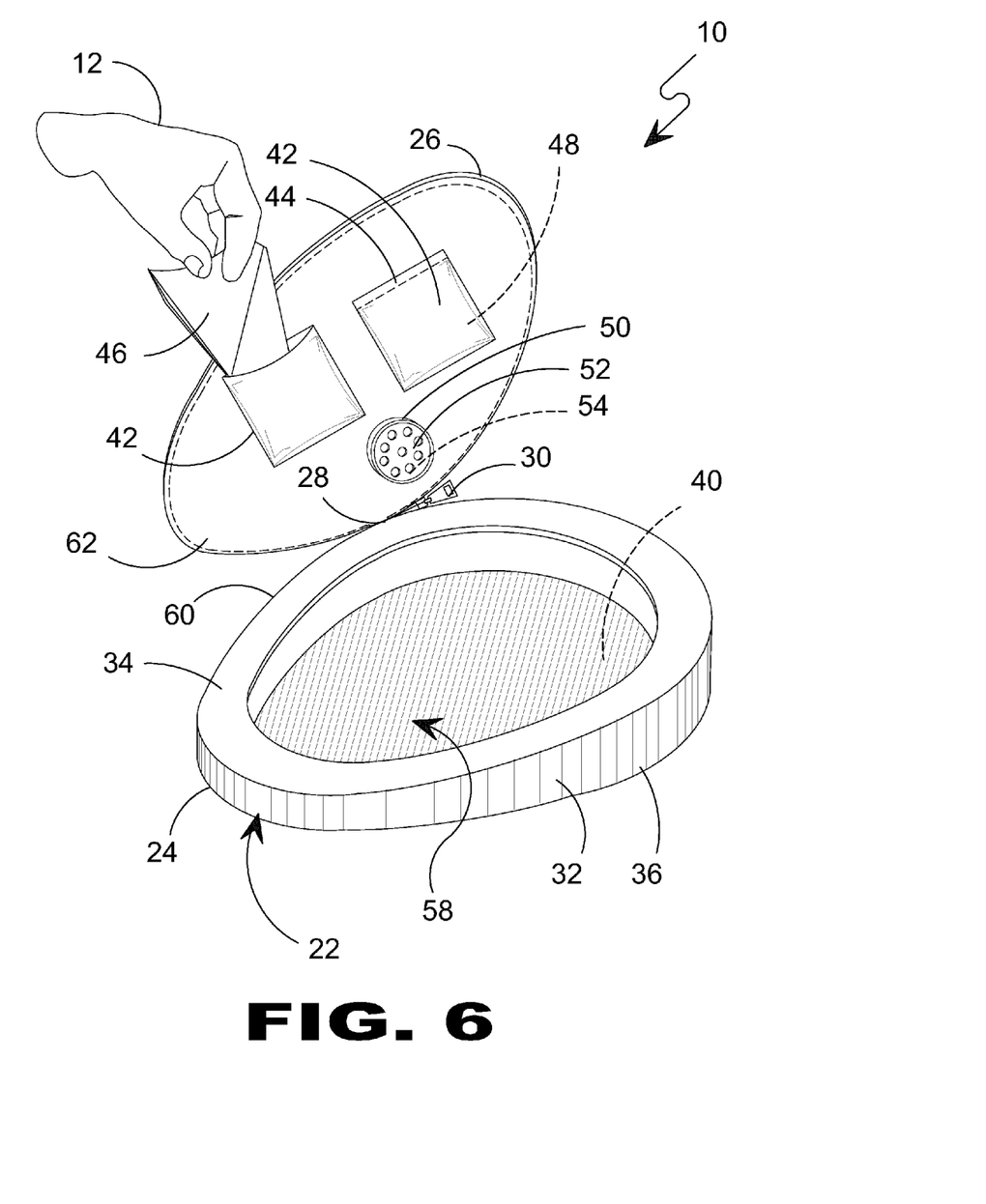
FIG. 6 is an illustrative view of the disposable portable toilet opened and the seal removed.

Referring to FIG. 6, shown is an illustrative view of the disposable portable toilet opened and the seal removed. Depicted is the disposable single use portable toilet 22 with body wipe 46 being removed by user 12. The toilet is comprised of rigid housing 24 having base 36, wall 32, interior 58, and seat 34 (having a periphery 60) covered by a peelably removable seal 38 with antibacterial agent 40 that is used to neutralize any pathogen contamination leaking from said disposable portable toilet after use. The antibacterial agent 40 could be a viscous liquid, a granular material, or a solid, sprayed or otherwise applied to the interior 58 of the toilet body portion 22. Lid 26 is attached to receptacle 24 via hinge 28 and zipper 30. It should be noted that this attachment may be accomplished by other means such as adhesives or mechanical clips, snaps, or magnetic seals. Additionally, the periphery of the interior 62 of the lid 26 may include a liquid-tight sealing gasket that mates with a gasket located on the upper seat periphery 60. On the interior side of lid 26 a plurality of packets 42 having tear strip 44 are provided for housing toiletries including body wipes 46 and hand wipes 48. Also provided is air freshener 50 having cover 52 that when removed releases scent 54.

Figure 7:
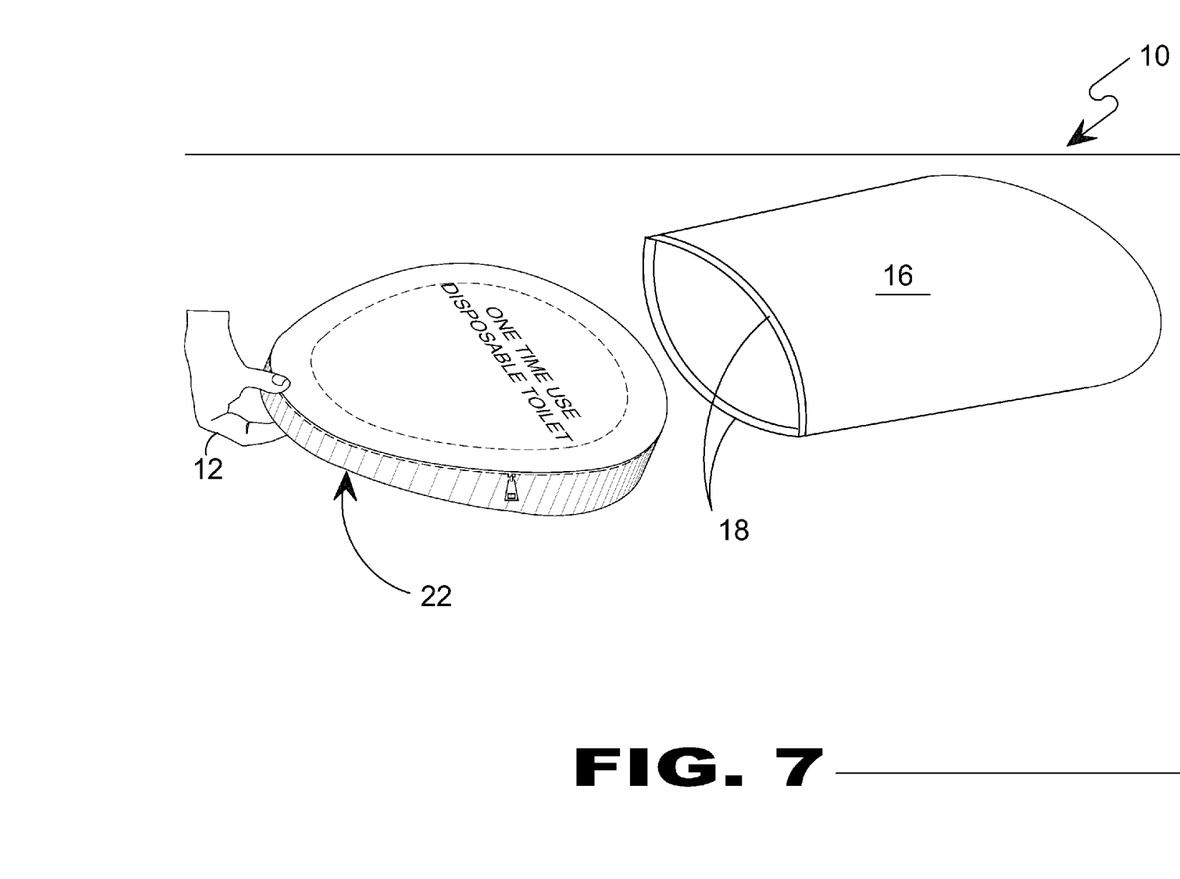
FIG. 7 is an illustrative view of the disposable portable toilet being repackaged for disposal.

Referring to FIG. 7, shown is an illustrative view of the disposable portable toilet being repackaged for disposal. Once used, the toilet 22 is closed via the zipper and placed back into its resealable container 16 and sealed via zip lock 18 by user 12 for disposal.

Figure 8:
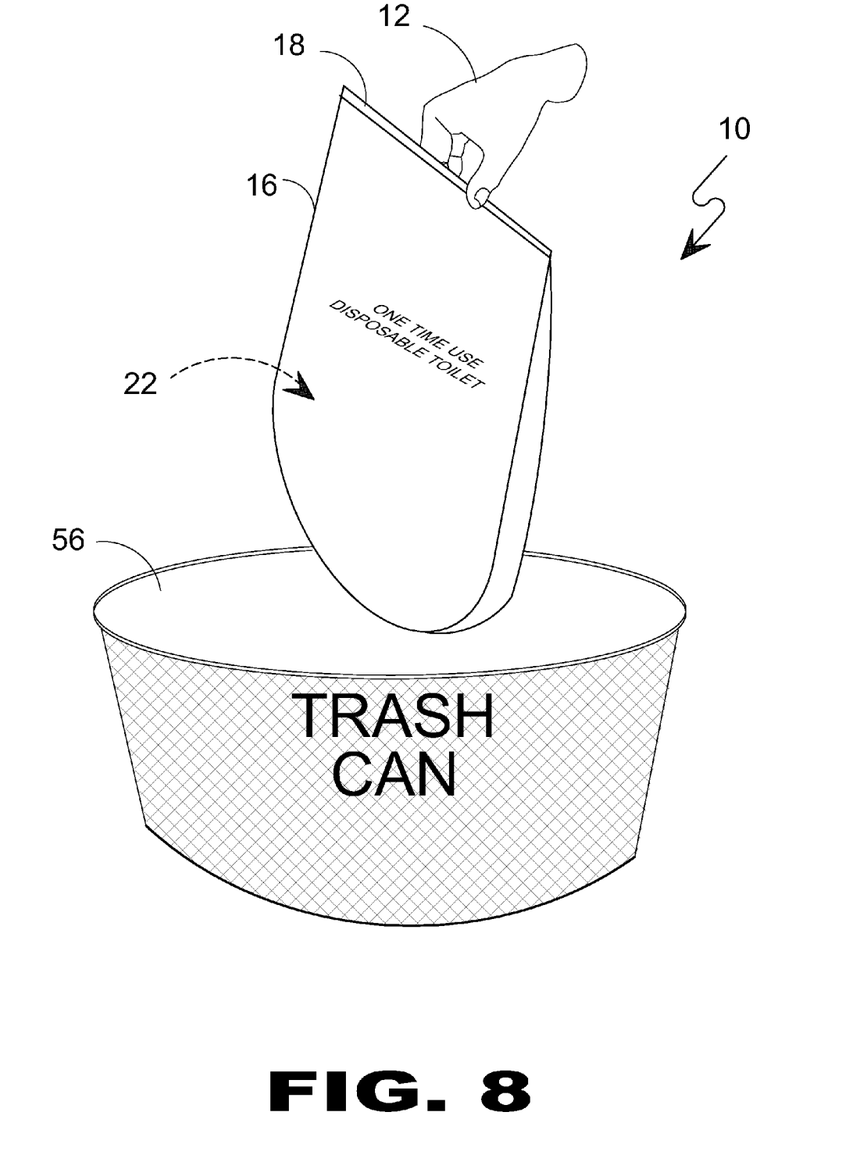
FIG. 8 is an illustrative view of the disposable single use portable toilet being discarded.

Referring to FIG. 8, shown is an illustrative view of the disposable single use portable toilet being discarded. After use, the toilet 22 is placed back into its resealable container 16 and sealed therein by zip lock 18 and deposited in trash container 56 by user 12.

Figure 9:
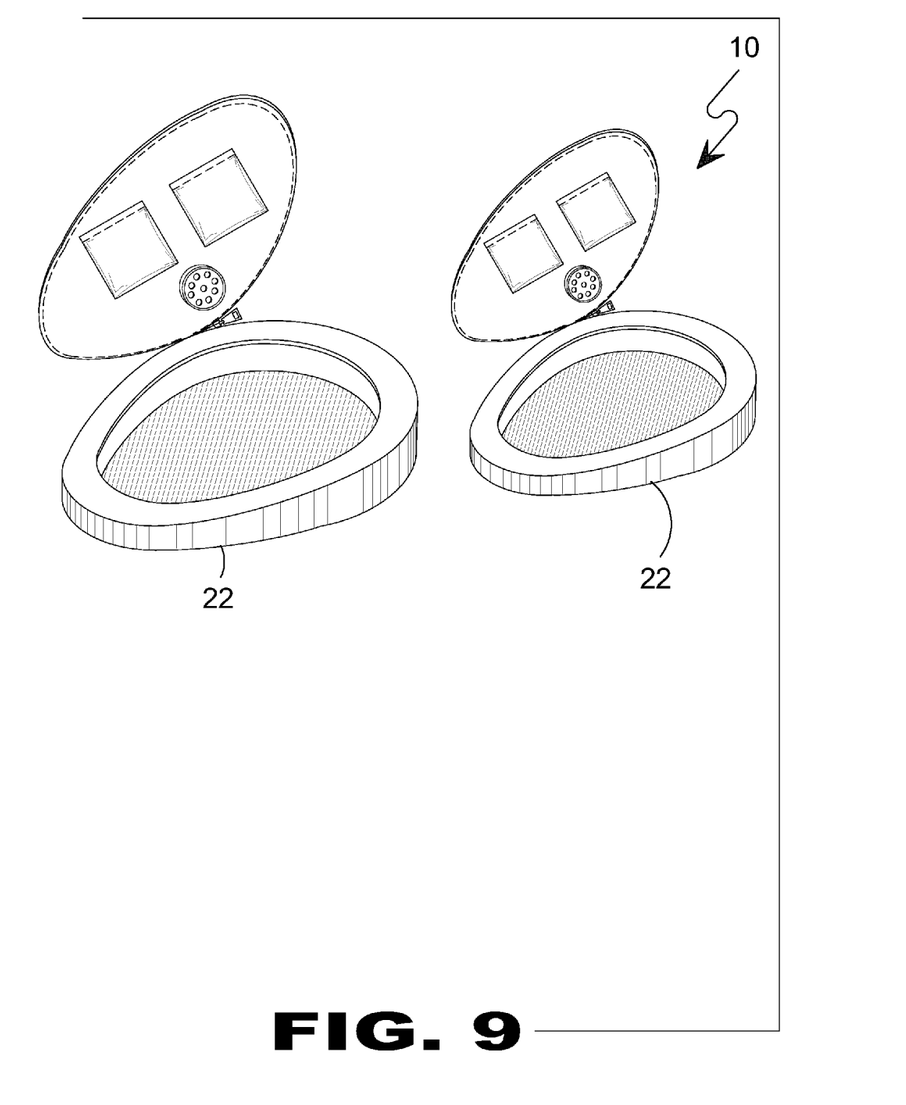
FIG. 9 are illustrations of child and adult toilets.

Referring to FIG. 9, shown are illustrations of child and adult toilets. The present invention provides that toilet 22 can be manufactured in various sizes to accommodate children and adults.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications

What is claimed is new and desired to be protected by Letters Patent is set forth in the appended claims:

1. A disposable single use portable toilet comprising:
   a flexible outer container having an opening on one side, said opening including releasable closure means and displaying indicia including directions for use;
   a removable toilet body portion located within said flexible outer container, said toilet body portion comprising a rigid housing adapted to support a user, where said rigid housing comprises a base having a front end, a back end, and a periphery, and where body portion side walls extend upward from said rigid housing periphery to form a toilet body seat; and
   a toilet lid hingedly attached to said toilet body seat and where said toilet lid includes an inner side and an outer side and further where said inner side of said toilet lid and said toilet body seat includes toilet sealing means adapted to prevent liquid spillage; whereby
   said removable toilet body portion may be taken from within said flexible outer container, said toilet lid opened such that the user may access the toilet body portion and then said toilet lid and said toilet body seat are resealed through said toilet sealing means, and further where said removable toilet body portion may be replaced within said flexible outer container and secured therein by said flexible outer container releasable closure means; and
   said toilet sealing means comprising cooperating adhesives located on said inner side of said toilet lid and on the periphery of said toilet body seat.

2. The disposable single use portable toilet as claimed in claim 1 where said outer container resealable closure means comprises a zipper fastener.

3. The disposable single use portable toilet as claimed in claim 1 where said outer container resealable closure means comprises a hook and loop type fastener.

4. The disposable single use portable toilet as claimed in claim 1 where said inner side of said toilet lid includes a plurality of packets attached thereto, where said packets contain cleaning wipes.

5. The disposable single use portable toilet as claimed in claim 4 where said inner side of said toilet lid further includes an air freshener attached thereto.

6. The disposable single use portable toilet as claimed in claim 5 where said toilet body and said toilet lid are constructed of plant fibers.

7. The disposable single use portable toilet as claimed in claim 6 where said plant fibers comprise corrugated cardboard.

8. A disposable single use portable toilet comprising:
   a flexible outer container having an opening on one side, said opening including releasable closure means;
   a removable toilet body portion located within said flexible outer container, said toilet body portion comprising a rigid housing adapted to support a user, where said rigid housing comprises a base having a front end, a back end, and a periphery, and where body portion side walls extend upward from said rigid housing periphery to form a toilet body seat and where said body portion side walls further define an interior of said toilet body portion and further where said toilet body seat includes a perimeter;
   a removable toilet interior seal located on said perimeter of said toilet body seat, said removable toilet interior seal comprising a plastic material adhesively attached to said perimeter of said toilet body seat; and
   a toilet lid hingedly attached to said toilet body seat and where said toilet lid includes an inner side and an outer side and further where said inner side of said toilet lid and said toilet body seat includes cooperating toilet sealing means adapted to prevent liquid spillage; whereby
   said removable toilet body portion may be taken from within said flexible outer container, said toilet lid opened such that the user may access the toilet body portion and then said toilet lid and said toilet body seat are resealed through said toilet sealing means, and further where said removable toilet body portion may be replaced within said flexible outer container and secured therein by said flexible outer container releasable closure means.

9. The disposable single use portable toilet as claimed in claim 8 where said toilet body and said toilet lid are constructed of plant fibers.

10. The disposable single use portable toilet as claimed in claim 9 where said toilet seat interior contains an antibacterial agent.

11. The disposable single use portable toilet as claimed in claim 10 where said antibacterial agent is selected from the group consisting of a) solids, b) viscous liquids, and c) granules.

12. The disposable single use portable toilet as claimed in claim 10 where said toilet sealing means comprises a zipper located on said inner side of said toilet lid and on the periphery of said toilet body seat.

13. The disposable single use portable toilet as claimed in claim 12 where said inner side of said toilet lid includes a plurality of packets attached thereto, where said packets contain cleaning wipes.

14. The disposable single use portable toilet as claimed in claim 13 where said inner side of said toilet lid further includes an air freshener attached thereto.

15. A disposable single use portable toilet comprising:
   a flexible outer container having an opening on one side, said opening including releasable closure means and where said flexible outer container further includes indicia providing directions for use;
   a removable toilet body portion located within said flexible outer container, said toilet body portion comprising a rigid housing made of plant fiber adapted to support a user, where said rigid housing comprises a base having a front end, a back end, and a periphery, and where body portion side walls extend upward from said rigid housing periphery to form a toilet body seat and where said body portion side walls further define an interior of said toilet body portion, and where said interior of said toilet body portion contains an antibacterial agent, and further where said toilet body seat includes a perimeter;
   a removable toilet interior seal located on said perimeter of said toilet body seat, said removable toilet interior seal comprising a plastic material adhesively attached to said perimeter of said toilet body seat; and
   a toilet lid hingedly attached to said toilet body seat and where said toilet lid includes an inner side and an outer side and further where said inner side of said toilet lid and said toilet body seat includes cooperating toilet sealing means adapted to prevent liquid spillage; and
   said toilet lid inner side further includes a plurality of packages containing cleaning wipes; whereby
   said removable toilet body portion may be taken from within said flexible outer container, said toilet lid opened such that the user may access the toilet body portion and then said toilet lid and said toilet body seat are resealed through said toilet sealing means, and further where said removable toilet body portion may be replaced within said flexible outer container and secured therein by said flexible outer container releasable closure means.

16. A disposable single use portable toilet comprising:

a flexible outer container having an opening on one side, said opening including releasable closure means and displaying indicia including directions for use;

a removable toilet body portion located within said flexible outer container, said toilet body portion comprising a rigid housing adapted to support a user, where said rigid housing comprises a base having a front end, a back end, and a periphery, and where body portion side walls extend upward from said rigid housing periphery to form a toilet body seat; and a toilet lid hingedly attached to said toilet body seat and where said toilet lid includes an inner side and an outer side and further where said inner side of said toilet lid and said toilet body seat includes toilet sealing means adapted to prevent liquid spillage; whereby said removable toilet body portion may be taken from within said flexible outer container, said toilet lid opened such that the user may access the toilet body portion and then said toilet lid and said toilet body seat are resealed through said toilet sealing means, and further where said removable toilet body portion may be replaced within said flexible outer container and secured therein by said flexible outer container releasable closure means; and where said toilet sealing means comprises a zipper located on said inner side of said toilet lid and on the periphery of said toilet body seat.

17. A disposable single use portable toilet comprising:

a flexible outer container having an opening on one side, said opening including releasable closure means and displaying indicia including directions for use;

a removable toilet body portion located within said flexible outer container, said toilet body portion comprising a rigid housing adapted to support a user, where said rigid housing comprises a base having a front end, a back end, and a periphery, and where body portion side walls extend upward from said rigid housing periphery to form a toilet body seat; and a toilet lid hingedly attached to said toilet body seat and where said toilet lid includes an inner side and an outer side and further where said inner side of said toilet lid and said toilet body seat includes toilet sealing means adapted to prevent liquid spillage; whereby said removable toilet body portion may be taken from within said flexible outer container, said toilet lid opened such that the user may access the toilet body portion and then said toilet lid and said toilet body seat are resealed through said toilet sealing means, and further where said removable toilet body portion may be replaced within said flexible outer container and secured therein by said flexible outer container releasable closure means; and where said toilet sealing means comprises hook and loop type fasteners located on said inner side of said toilet lid and on the periphery of said toilet body seat and where said toilet sealing means further comprises cooperating gaskets on both said inner side of said toilet lid and said toilet body seat.

\* \* \* \* \*